No. 607,614. Patented July 19, 1898.
K. CHICKERING.
SUCKER ROD JOINT.
(Application filed Dec. 27, 1897.)
(No Model.)
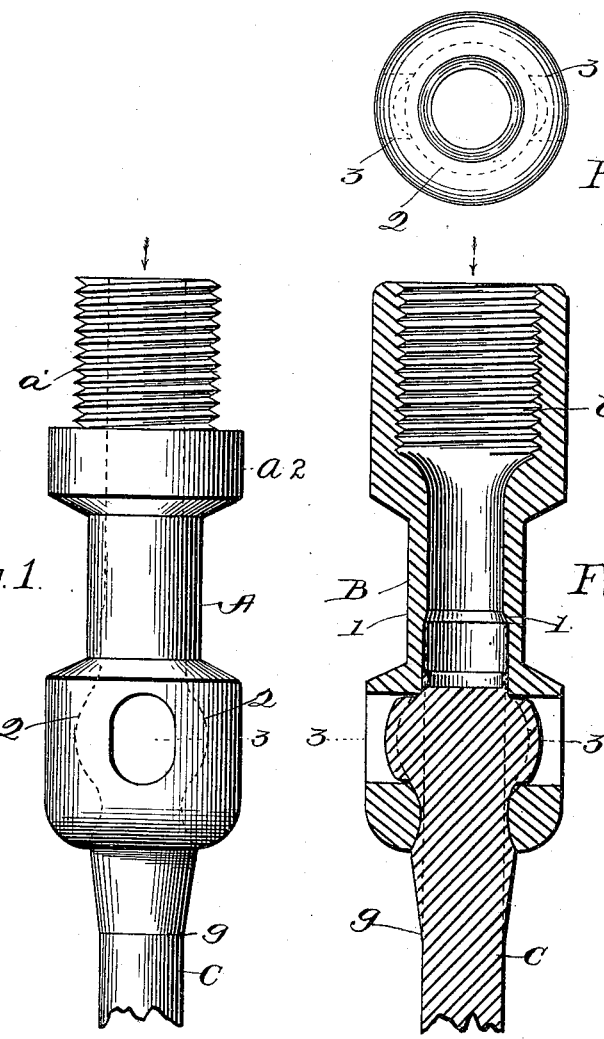

UNITED STATES PATENT OFFICE.

KENTON CHICKERING, OF OIL CITY, PENNSYLVANIA.

SUCKER-ROD JOINT.

SPECIFICATION forming part of Letters Patent No. 607,614, dated July 19, 1898.

Application filed December 27, 1897. Serial No. 663,703. (No model.)

*To all whom it may concern:*

Be it known that I, KENTON CHICKERING, a citizen of the United States, residing at Oil City, in the county of Venango, State of Pennsylvania, have invented certain new and useful Improvements in Sucker-Rod Joints; and I hereby declare the following to be a full, clear, and exact description of the same, reference being had to the accompanying drawings, in which—

Figure 1 is a view in elevation of the male section of a sucker-rod joint embodying my invention and a portion of the sucker-rod, the dotted lines showing the form or shape of the bore of the joint. Fig. 2 is a longitudinal central section of the female or internally-threaded sleeve-section of the joint and a portion of the sucker-rod, showing the character of the union between the sucker-rod and the sucker-rod joint; and Fig. 3 is an end view of the female section, the dotted line indicating the form of the enlargement of the bore thereof and the position of the lateral openings therein.

Like symbols refer to like parts wherever they occur.

My invention relates to the construction of sucker-rod joints and the manner of securely attaching the same to the sucker-rods, and has for its object the production of a strong and perfect connection between the rod and joint by a simple and inexpensive method.

In pumping artesian and oil wells which are of great depth sucker-rods composed of sections united by screw-joints are used, and owing to the weight and constant vibration said joints and rods are subject to the connection of the rod-sections to the joint-sections must be very strong and perfect throughout. The common method of uniting the joint to the wooden sucker-rod is by riveting thereto a metal strap connection or sucker-rod joint having a threaded pin and box; but such construction results in a material weakening of the rod, besides which wooden sucker-rods are objectionable for various well-known reasons. To overcome such objections, metallic sucker-rods have been constructed and connected by joint-sections having bores countersunk at the ends, the sucker-rod being upset at its end to swell out and fill the countersunk ends of the bore-section, thus forming a species of rivet-joint; but as heretofore practiced such method has resulted in a percentage of weak and imperfect connections, owing to the inability to accurately gage the requisite amount of metal to fill the countersunk ends of the joint-bore, either an excess or deficit of metal resulting in an imperfect or insecure connection. To overcome said objections and secure a perfect connection between the rod and joint-section, I provide a tubular joint having an outlet-opening or escape-orifice, whereby when said joint is united to the rod by upsetting or swelling the rod within the bore of the joint any excess of metal will escape laterally, forming a T-head or cross-pin integral with the rod, and such a construction or its equivalent embodies the main feature of my invention.

There are other minor features of invention, all as will hereinafter more fully appear.

I will now proceed to describe my invention more fully, so that others skilled in the art to which it appertains may apply the same.

In the drawings, A indicates the male section, and B the female section, of a sucker-rod joint, the one having the usual threaded pin $a'$ and collar $a^2$ and the other the internally-threaded sleeve or box $b$, and both preferably enlarged (or equal in diameter to the collar $a^2$ and box $b$) at the point of union with the sucker-rod C. Each of said sections A B is tubular or formed with a bore, the internal diameter in general being substantially that of the sucker-rod, except at the point 1, where it is reduced to form a gage-shoulder to limit the introduction of the rod in the operation of uniting the joint to the rod, and also at the point 2, where the bore may be enlarged to form an expansion-chamber for the reception of the upset metal in the end of the sucker-rod. At said point 2 one or more outlet-openings 3, (preferably two,) extending transversely through the walls of the joint, are formed to permit the escape of any excess of metal in the upset portion of the sucker-rod C, which metal overflows from the expansion-chamber of the joint and forms a T-head or cross-pin integral with the sucker-rod.

The sucker-rod joint-sections A B may be produced in any desired manner or from any suitable metal, but are preferably cored malleable-iron castings, the pin $a'$ and the box $b$ being cut or dressed by the usual methods.

In uniting the joint-sections to the sucker-rod the joint-section is put into an upsetting-machine or any suitable holder which will retain the section, with its axis in the line of the upsetting-plunger, after which the end of the sucker-rod C, heated to the proper temperature, is inserted into the bore of the section and passed forward until arrested by the gage-shoulder 1, whereupon it is gripped at the point $g$ and securely held during the operation of the upsetting-tool, which is introduced into the bore of the joint-section, as indicated by the arrows, Figs. 1 and 2, and upsets the end of the rod, swelling the same out until the surplus metal escapes laterally into the openings 3 and forms a T-head or cross-pin of greater or less extent, according to the excess of metal.

Having thus described my invention, what I claim, and desire to secure by Letters Patent, is—

1. A tubular open-ended sucker-rod joint-section having a transverse or lateral overflow outlet, substantially as and for the purposes specified.

2. The combination with a sucker-rod joint-section having a central bore and transverse overflow outlet or perforation, of a metal sucker-rod having an upset end forming a T-head or cross-pin integral with the sucker-rod, substantially as and for the purposes specified.

3. A sucker-rod joint-section having a central bore provided with a gage-shoulder and having a transverse overflow or outlet opening, substantially as and for the purposes specified.

In testimony whereof I affix my signature, in presence of two witnesses, this 25th day of December, 1897.

KENTON CHICKERING.

Witnesses:
J. R. CAMPBELL,
JAMES HAMILTON.